INVENTOR.
Carl Vorpahl
BY
James A. Eisenman
ATTORNEY

United States Patent Office 3,279,756
Patented Oct. 18, 1966

3,279,756
ADJUSTING TOOL FOR WHEEL ALIGNMENT
Carl Vorpahl, 7000 Dallas Road N.,
Minneapolis, Minn.
Filed Jan. 7, 1965, Ser. No. 423,968
4 Claims. (Cl. 254—100)

This invention relates to adjusting tools for vehicle wheel suspensions and in particular to adjusting tools for effecting the adjustment of caster and camber in front wheel A-frame suspensions for automobiles.

Camber and caster adjustments are critical to the front wheel suspension of vehicles, for both safety and economy. Typically, motor vehicles provide slot or other adjusting means for adjustably shifting parts to effect desired wheel position. In the case of certain A-frame suspension, however, limited working or access space, coupled with the geometry of the A-frame itself, makes it difficult to secure the positions of the parts, including the A-frame itself, in the desired position until such time as the lock nuts or other clamping means can be set up tight.

Accordingly, it is the purpose of the present invention to provide a simple tool for adjusting the camber and caster of A-frame wheel suspensions in motor vehicles. Another object of the present invention is to provide a tool for facilitating the adjustment of vehicle wheels by holding the wheel suspension parts in predetermined positions when they are loosened on the vehicle and to enable the wheel to be adjusted to its proper position through the medium of the holding tool itself.

In accordance with the present invention there is provided a suspension beam adapted to be coupled to the under side of the lower A-frame of a wheel suspension through existing elements such, for example, as the shock absorber mounting bolts and which carries it to respective end adjusting members adapted to bear against relatively first abutments on the frame or body of the vehicle so that the A-frame can, through actuation of the adjusting members, be moved laterally in translation to displace the A-frame laterally. The adjusting members also can be actuated differentially to effect a turning mode of adjustment in which the A-frame, through the veam suspension of the tool, is cocked or pivoted. In one preferred embodiment of the invention the translation mode controls the wheel camber and the tilting or rotating mode controls the caster, negatively or positively, depending on the direction of rotation or translation.

Figure 1:
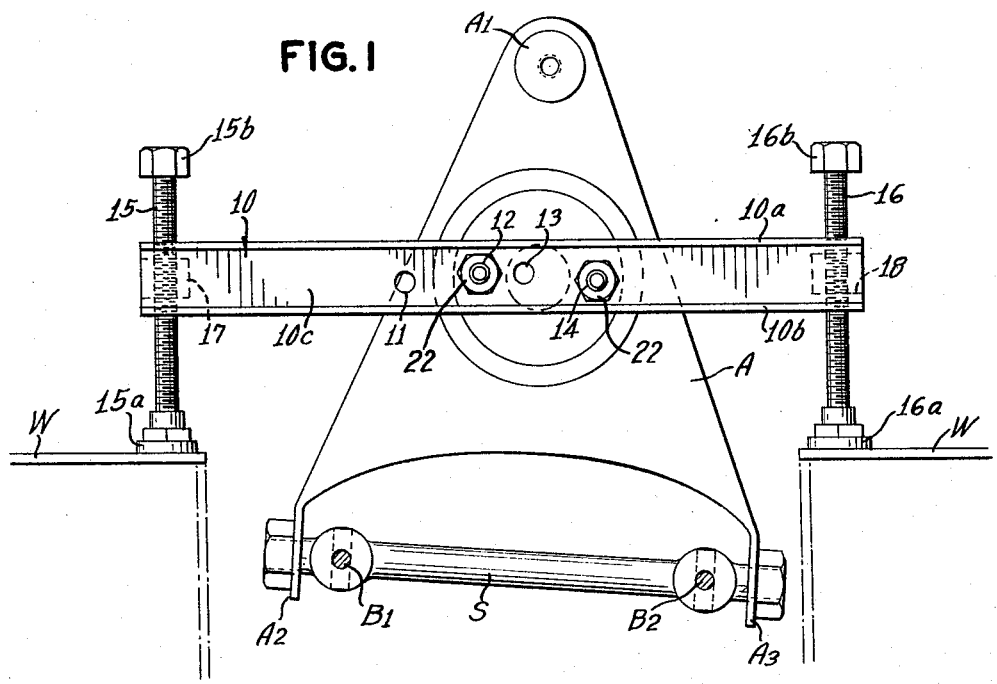
Figure 2:
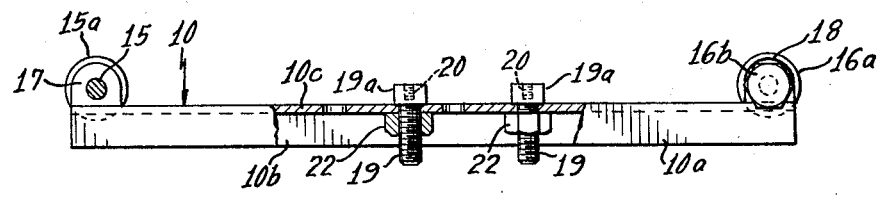

The above and other features of the invention will be apparent, having reference to the accompanying drawing in which:

FIGURE 1 is a plan view of the under side of the adjusting tool and showing, in phantom lines, the under side of the lower A-frame of a vehicle wheel suspension; and FIGURE 2 is a view in side elevation of the adjusting tool of FIGURE 1, shown detached from the automobile and partly broken away to reveal clamping parts.

Referring to the drawing, the invention is illustrated as embodied in a tool for adjusting caster and camber in A-frame suspensions and motor vehicle wheels. The tool includes a carrier beam 10, preferably taking the form of a channel beam with the flanges 10a and 10b facing downward when the tool is in use. The web 10c of the channel is formed in its central regions with four holes, 11, 12, 13 and 14, of which the holes 11 and 13 correspond to the spacing of the left hand shock absorber mounting bolts of the vehicle and the holes 12 and 14 to the right hand shock absorber mounting bolts. It will be observed that the hole pairs are offset slightly with respect to the longitudinal axis of the beam 10, thus effecting correct preliminary orientation of the tool when mounted on the vehicle. Disposed at either end of the beam 10 are adjusting members. The adjusting members preferably take the form of threaded bolts 15 and 16 carrying pressure swivel pads 15a and 16a at one end and hex heads 15b and 16b at their other ends. Tapped bosses or lugs 17 and 18 are affixed to the ends of the beam 10 on the flat side thereof and are tapped to receive the threaded bolts 15 and 16.

In mounting the tool on the vehicle the studs which normally couple the shock absorber to the control arm of the vehicle are utilized. The studs are effectively extended by extension bolts 19, including an enlarged head portion 19a formed with a tapped hole 20 to receive the shock absorber mounting studs. The beam 10 of the adjusting tool is then mounted on the shanks of the extension bolts 19 using the appropriate pair of holes 11–13 or 12–14, and nuts 22 are threaded onto the shanks to bolt the beam in place, thereby securing the beam tightly to the A-frame A of the motor vehicle, as best seen in FIGURE 1. It will be observed that the swivel pads 15a and 16a of the adjusting members 15 and 16 are disposed adjacent frame parts of the vehicle which in the illustrated case comprise fender wells W. The A-frame A includes at its apex a ball joint assembly A–1 which couples to the upper end of the spindle as part of a conventional motor vehicle wheel mount. The two legs A–2 and A–3 of the A-frame are pivotally mounted on the inner A-frame shaft S which is in turn bolted to the frame of the vehicle by means of bolts B–1 and B–2 through mounting slots in the body portion. In order to adjust the camber and caster the A-frame is moved in translation in the slots, and in order to adjust the caster the A-frame is moved differentially in the two slots, i.e. forward in one and backward in the other.

To this end the adjusting tool is actuated, after the A-frame suspension is loosened, by loosening the bolts B–1 and B–2 by turning the adjusting bolts 15 and 16 until the desired wheel adjustment is attained as measured externally of the vehicle by conventional gauge means. For example, positive camber adjustment is effected by tightening both bolts 15 and 16 in equal amounts. Typically, a full turn will effect a ¼ degree increase. Similarly, loosening the bolts 15 and 16 will effect a decrease, insuring that the pads 15a and 16a maintain contact with the reference abutments W. Positive caster is effected by differentially actuating the bolts 15 and 16 with one turn on each, typically effecting a ½ degree caster change, negatively or positively, depending on which bolt is rotated clockwise and which counterclockwise. The desired adjustment having been effected the tool will hold the adjustable part securely in place until the bolts B–1 and B–2 are set up and locked in position, after which the tool is removed from the vehicle.

While the invention has been described and illustrated herein having reference to its preferred embodiment thereof it will be understood that it can take other forms and arrangements without departing from the scope of the invention. Thus, for example, the adjusting bolts can be threaded through the flanges of the channel and other beam configurations can be used. The invention should not, therefore, be regarded as limited except as defined in the following claims.

I claim:

1. Apparatus for facilitating the adjustment of caster and camber in the wheel suspensions of vehicles in which the wheel is carried on an adjustable, pivotally mounted frame, comprising, a beam member adapted to be rigidly coupled to the adjustable frame to extend beyond the extremeties thereof, a first adjustable member disposed adjacent one end of the beam and a second adjustable member disposed adjacent the other end of the beam, adjustment members adapted to engage fixed reference points on said vehicle connected, respectively, to said adjusting means and movable therewith, said adjusting means being movable transversely of the axis of said beam and means to actuate said adjusting means independently to effect, selectively, translational movement of the beam and the frame part carried thereby and turning movement of the beam through an axis passing through the frame part normal to the beam.

2. Apparatus as set forth in claim 1, said adjusting means comprising a pair of threaded members carried by the respective ends of the beam and adjusting movement transversely of the axis of the beam, pivoted abutment paths carried by the respective ends of the threaded members to engage the fixed reference services of the vehicle and wrench engaging heads on the other end of said threaded members for adjustable turning movement.

3. Apparatus as set forth in claim 2, the central portion of said beam being formed with a plurality of spaced apertures, at least two coupling members movably mounted in the apertures in the beam and each including an enlarged head portion formed with a central tapped bore adapted to be threaded on the proximate threaded stud members which are part of the vehicle wheel suspension, whereby the beam can be attached to the frame part of the vehicle wheel suspension offset therefrom.

4. Apparatus as set forth in claim 3, said beam member comprising a channel member in which said mounting apertures are formed in the central portion of the web, and threaded mounting lugs secured to the outer surface of the web adjacent the ends of the beam to receive said threaded adjusting members.

References Cited by the Examiner

UNITED STATES PATENTS

| | | | |
|---|---|---|---|
| 3,199,837 | 8/1965 | Vestal et al. | 254—1 |
| 3,229,959 | 1/1966 | Smothers | 254—100 |
| 3,240,472 | 3/1966 | Jones | 254—100 |

WILLIAM FELDMAN, *Primary Examiner.*

O. M. SIMPSON, *Assistant Examiner.*